Figure 1:
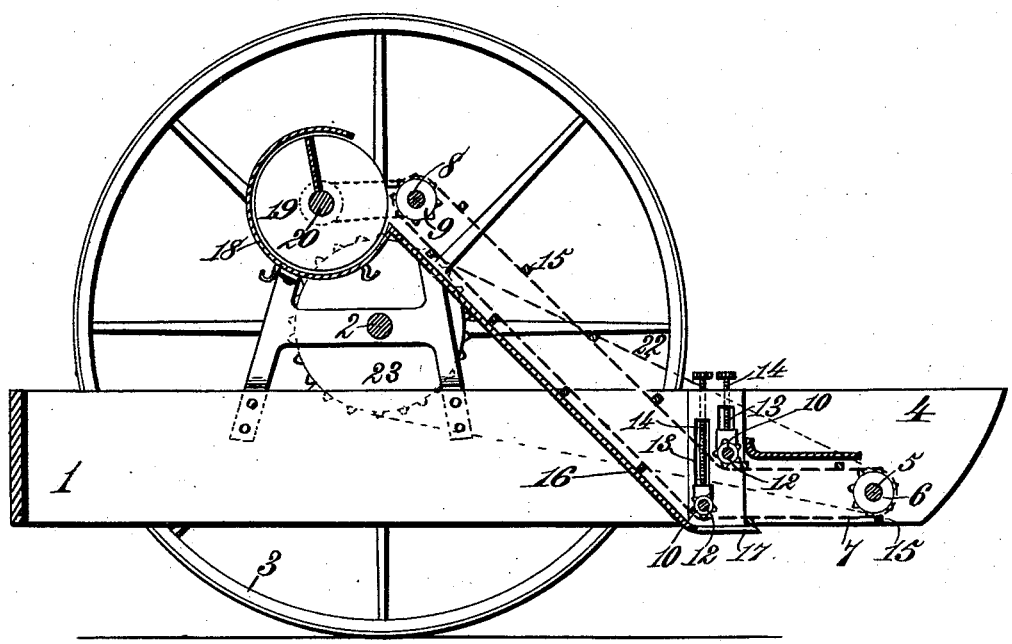

(No Model.) 2 Sheets—Sheet 1.
R. W. SHELY.
APPARATUS FOR GATHERING SEED OR GRAIN.

No. 566,099. Patented Aug. 18, 1896.

Witnesses.
Robert Burnett
Thos. A. Green

Inventor:
Richard W. Shely.
By James L. Norris.
Atty.

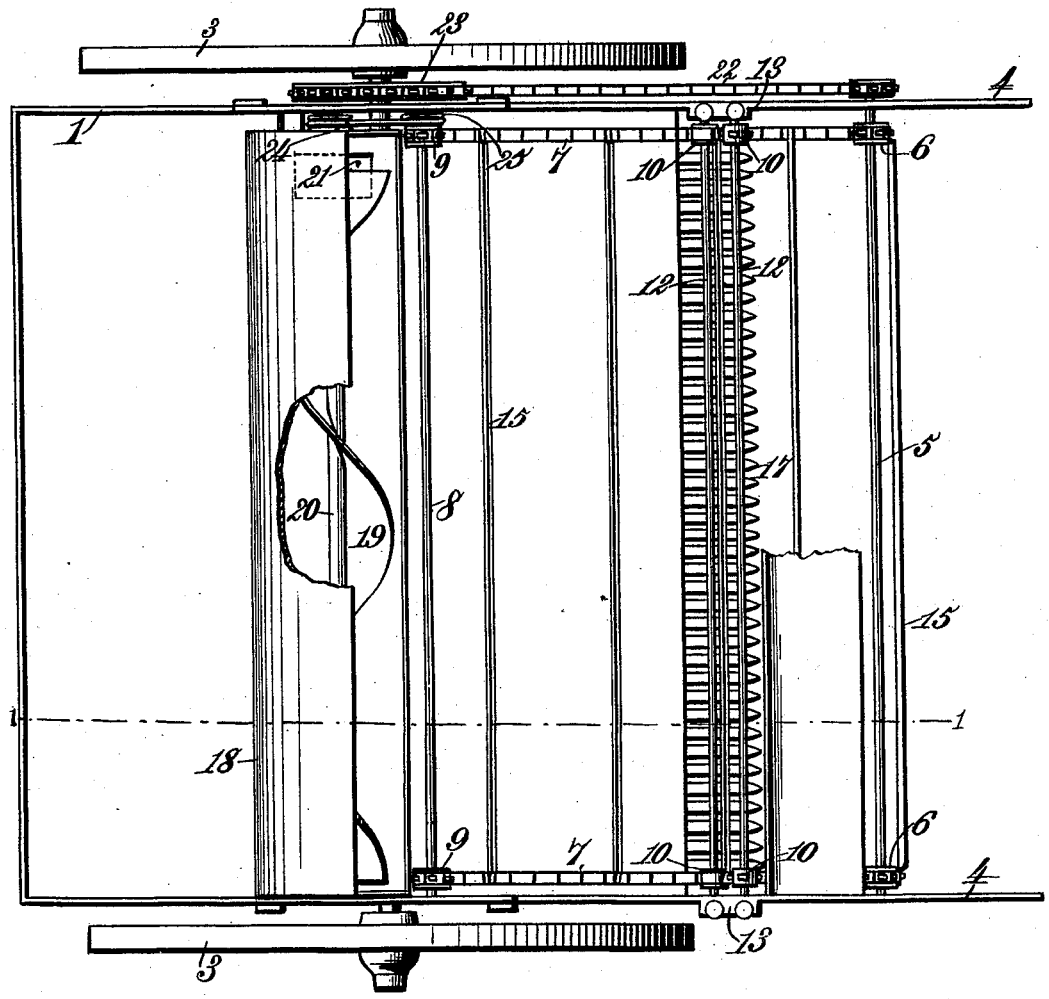

UNITED STATES PATENT OFFICE.

RICHARD W. SHELY, OF LEXINGTON, KENTUCKY.

APPARATUS FOR GATHERING SEED OR GRAIN.

SPECIFICATION forming part of Letters Patent No. 566,099, dated August 18, 1896.

Application filed June 20, 1895. Serial No. 553,449. (No model.)

*To all whom it may concern:*

Be it known that I, RICHARD W. SHELY, a citizen of the United States, residing at Lexington, in the county of Fayette and State of Kentucky, have invented new and useful Improvements in Apparatus for Gathering Seed or Grain, of which the following is a specification.

My invention relates to apparatus for gathering seed or grain, my object being to provide a simple mechanism, produced at a comparatively low cost, capable of being mounted upon or attached to any ordinary seed or grain gathering carriage and successfully operated without requiring any material change or expense.

It is my further object to provide an apparatus of this type having such organization that the hulling or seed-separating devices shall have operative action over a space of from eight to eighteen inches in the line of draft and at any angle or curvature, whereby the seed or grain is cut or stripped from the stalk, cleanly gathered, and preserved from loss.

It is a further object of my invention to provide a seed or grain gathering apparatus with continuously-moving scrapers so arranged as to have substantially rectilinear movement over and in conjunction with the rigid teeth which gather and support the stalks, said movement beginning some distance in advance of the points of the teeth which gather the seed back, thereby acting as a most efficient reel.

It is one purpose of my invention to simplify and improve the construction and operation of this type of apparatus, to enable the seed or grain to be sacked, and the full sacks or bags to be tied and removed without stopping the machine and without losing seed.

The invention consists in the novel features of construction and new combinations of parts hereinafter fully explained, and then particularly pointed out and defined in the claims which conclude this specification.

To enable those skilled in the art to which my said invention pertains to fully understand and use the same, I will now describe the said invention in detail, reference being had to the accompanying drawings, in which—

Figure 1 is a vertical section upon the line 1 1 in Fig. 2, showing a seed and grain gathering apparatus containing my invention. Fig. 2 is a plan view of the parts shown in Fig. 1.

The reference-numeral 1 in said drawings indicates the frame of the machine, which consists substantially of a rectangular box or inclosure extending both in rear and in front of an axle 2, and ground-wheels 3, by which said frame is supported. The forward portion of said frame consists of two parallel side pieces 4, extending beyond the forward end of the box to a suitable distance. In the forward ends of said side pieces 4 is journaled a shaft 5, extending from one side piece to the other and provided at each end with a sprocket 6. Over each sprocket runs a sprocket-chain 7, which extends rearward for a suitable distance in a plane substantially coincident with the lower edges of the side pieces 4, being then directed upward and rearward at any suitable angle, such, for example, as an angle of forty-five degrees, as seen in Fig. 1. A little above the axle 2 is arranged a shaft 8, journaled in uprights or brackets on the box-frame. Upon the ends of this shaft are sprockets 9, over which the sprocket-chains 7 are carried, the inclined and horizontal portions of said sprocket-chains being maintained in their relative positions and under suitable tension by means of tension-sprockets 10, carried by shafts 12, arranged at the intersections of the two horizontal and inclined portions of said sprockets. The shafts 12 are journaled in boxes which are adjustable vertically in ways 13 in the side pieces 4, and are adjusted in either direction by means of threaded shafts 14.

Upon the sprocket-chains 7, at suitable intervals, are mounted steel or iron scrapers 15, extending from side to side and lying at any desired angle with the line of draft. Upon the box-frame, between the sides thereof, is arranged an inclined partition or diaphragm 16, parallel with and lying close to the sprocket-chains 6. Upon the lower edge of this inclined diaphragm are formed or mounted a series of gathering-teeth 17, having a suitable length and lying in parallelism with the lower edges of the side pieces 4. The shaft 5 is located at some little distance in front of the ends of the teeth 17, and they lie in such a plane that the scrapers 15 pass just above them and in parallelism therewith until the tension-sprockets 10 are reached, at which point the sprocket-chains 7 are brought into parallelism with the inclined diaphragm 16.

Parallel with the shaft 8, and in as close proximity to the same as the upper sprockets 9 will permit, is a cylindrical casing 18, extending from side to side of the machine-frame and supported on the same by brackets or risers which support the shaft 2. In this casing is a spiral feeder 19, carried by a shaft 20, one end of said feeder being terminated at a short distance from the side of the box. The whole cylindrical wall of said casing is open in a line parallel with the shaft 12 and at such point that the scrapers which carry the seed or grain up the inclined diaphragm will discharge the same directly into the cylindrical casing, where it is fed longitudinally to an opening 21 in said casing, beneath which a sack or bag is suspended to receive the seed. When this bag is filled, it is removed and tied and an empty bag is substituted without arresting the action of the apparatus, the seed or grain escaping meantime being discharged into the box, from which it is readily recovered.

Operative movement is imparted to the shaft 5 by means of a sprocket-chain 22, driven by a sprocket-gear 23 on the axle 2. From the shaft 5 motion is communicated to the shaft 8 by means of the sprocket-chains 7. The shaft 20, carrying the spiral conveyer, is driven by a belt or sprocket 24, driven by a pulley 25 on the shaft 8.

What I claim is—

1. An apparatus for gathering seeds, or grain, comprising a frame, a series of scrapers carried by sprocket-chains and having movement over and parallel with a series of gathering-teeth and thence rearwardly and upwardly in an inclined direction, an inclined table arranged beneath said sprocket-chains and in close proximity and parallel thereto, and a spiral feeder arranged in a casing which receives the seed, or grain, from said scrapers and delivers the same to a sack or bag, substantially as described.

2. In an apparatus for gathering seeds, or grain, the combination with a series of gathering-teeth, of a series of scrapers carried by sprocket-chains, rolls supporting the latter and located one in front of the points of said teeth and the other above and in the rear of the series of teeth, an inclined diaphragm arranged in the rear of said teeth, and means for guiding the said scrapers rectilinearly across the top of said teeth and thence upwardly in close proximity to the inclined table, substantially as described.

3. In an apparatus for gathering seeds, or grain, the combination with a movable frame carrying a rearwardly-inclined diaphragm, of a series of horizontally and forwardly projecting gathering-teeth arranged at the lower forward edge of the inclined diaphragm, sprocket-chains carrying scrapers, guide-rolls for guiding said sprocket-chains in close proximity to said teeth and driving-rolls journaled in advance of the points of said teeth, whereby the scrapers have continuous movement above and parallel to the plane of said teeth both before and after reaching the points of the same and are also caused to move upwardly and rearwardly over the said diaphragm.

4. The combination with a box-frame, of an axle and ground-wheels, an inclined diaphragm in front of said axle and extending downwardly and forwardly, a series of gathering-teeth projecting horizontally forward from the lower end of said inclined diaphragm, shafts arranged at the top of said inclined diaphragm and at the forward end of the frame, sprocket-chains carried by sprockets on said shafts, scrapers mounted on said chains and extending from side to side of the frame, guide-sprockets for causing the scrapers to move in contact with the gathering-teeth and with the inclined diaphragm, a spiral conveyer arranged to receive the seed from the inclined diaphragm, and means for regulating and maintaining the tension of said sprocket-chains, substantially as described.

5. The combination with a box-frame, of an axle and ground-wheels, an inclined diaphragm in front of said axle and extending downwardly and forwardly, a series of gathering-teeth projecting horizontally forward from the lower end of said inclined diaphragm, shafts arranged at the top of said inclined diaphragm and at the forward end of the frame, sprocket-chains carried by sprockets on said shafts, scrapers mounted on said chains and extending from side to side of the frame, guide-sprockets arranged to engage said sprocket-chains at the foot of said inclined diaphragm to cause the scrapers to move over the gathering-teeth and over the inclined diaphragm, threaded shafts adapted to adjust the journal-boxes supporting the shafts of said guide-sprockets to bring the scrapers nearer to or farther from the gathering-teeth and inclined diaphragm and to regulate the tension of the sprocket-chains, and a spiral conveyer arranged to receive the seed from the inclined diaphragm, substantially as described.

In testimony whereof I have hereunto set my hand in presence of two subscribing witnesses.

RICHARD W. SHELY.

Witnesses:
WM. R. DONALDSON,
T. T. FORMAN.